US007617080B2

(12) United States Patent
Barbour et al.

(10) Patent No.: US 7,617,080 B2
(45) Date of Patent: Nov. 10, 2009

(54) IMAGE ENHANCEMENT BY SPATIAL LINEAR DECONVOLUTION

(75) Inventors: Randall L. Barbour, Glen Head, NY (US); Harry L. Graber, Brooklyn, NY (US); Yaling Pei, Morris Plains, NJ (US); Yong Xu, Brooklyn, NY (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 133 days.

(21) Appl. No.: 10/894,317

(22) Filed: Jul. 19, 2004

(65) Prior Publication Data
US 2005/0055184 A1     Mar. 10, 2005

Related U.S. Application Data

(60) Provisional application No. 60/488,325, filed on Jul. 18, 2003.

(51) Int. Cl.
*G06F 7/60* (2006.01)
*G06F 17/10* (2006.01)
(52) U.S. Cl. .................. 703/2; 703/7; 703/11; 382/131; 382/260; 382/279
(58) Field of Classification Search .................. 703/12, 703/2
See application file for complete search history.

(56) References Cited

U.S. PATENT DOCUMENTS 5,408,424 A * 4/1995 Lo .............................. 708/303
5,581,490 A   12/1996 Ferkinhoff et al.
5,780,830 A   7/1998 Boie et al.

(Continued)

FOREIGN PATENT DOCUMENTS

WO     WO 01/20306 A1    3/2001

OTHER PUBLICATIONS

Yao et al, "Frequency-domain Optical Imaging of Absorption and Scattering Distributions by a Born Iterative Method", Journal of the Optical Society of America, vol. 14, No. 1, Jan. 1997, pp. 325-342.*

(Continued)

*Primary Examiner*—Kidest Bahta
*Assistant Examiner*—Mary C Jacob
(74) *Attorney, Agent, or Firm*—Scully, Scott, Murphy & Presser, P.C.

(57) ABSTRACT

Data from a target system (616) that exhibits a non-linear relationship between system properties and measurement data, is processed by applying a linear filter (F) to improve resolution and accuracy. The filter reduces inaccuracies that are introduced by an algorithm used to reconstruct the data. The filter is defined by assigning time varying functions, such as sinusoids (200), to elements (210) in a model (Y) of the system to perturbate the elements. The resulting data output from the model is reconstructed using the same algorithm used to subsequently reconstruct the data from the target system. The filter is defined as a matrix (F) that transforms the reconstructed data of the model (X) back toward the known properties of the model (Y). A library of filters can be pre-calculated for different applications. In an example implementation, the system is tissue that is imaged using optical tomography.

22 Claims, 10 Drawing Sheets

U.S. PATENT DOCUMENTS

| | | | |
|---|---|---|---|
| 6,260,005 B1 | 7/2001 | Yang et al. | |
| 6,285,969 B1 | 9/2001 | Svatos | |
| 6,584,413 B1 | 6/2003 | Keenan et al. | |
| 6,675,106 B1 | 1/2004 | Keenan et al. | |
| 6,707,878 B2 * | 3/2004 | Claus et al. | 378/22 |
| 6,751,284 B1 * | 6/2004 | Claus et al. | 378/22 |
| 6,937,689 B2 * | 8/2005 | Zhao et al. | 378/9 |
| 7,339,170 B2 * | 3/2008 | Deliwala | 250/351 |

OTHER PUBLICATIONS

Tabus et al, "A Training Framework for Stack and Boolean Filtering-Fast Optimal Design Procedures and Robustness Case Study", IEEE Transactions on Image Processing, vol. 5, No. 6, Jun. 1996.*

Graber et al, "Quantification and Enhancement of Image Reconstruction Accuracy by Frequency Encoding of Spatial Information", Conference Paper, Biomedical Topical Meeting, Miami Beach, FL, Apr. 7, 2002.*

Graber et al, "Spatiotemporal Imaging of Vascular Reactivity", Proc. SPIE vol. 3978, p. 364-376, Medical Imaging Apr. 2000.*

Morse et al, "A Graphical User Interface for Geotomography", Conference record of the 1994 IEEE Industry Applications Society Annual Meeting, Denver, CO, Oct. 2-6, 1994.*

Graber H.L. et al., "Nonlinear Effects of Localized Absorption Perturbations on the Light Distribution in a Turbid Medium", *J. Optical Society of America America*, 15(4):834-848 (1998).

Pei Y. et al., "A Fast Reconstruction Algorithm for Implementation of Time-Series DC Optical Tomography", *Optical Tomography and Spectroscopy of Tissue V (Proceedings of SPIE)*, 4955:236-245 (2003).

* cited by examiner

IMAGE ENHANCEMENT BY SPATIAL LINEAR DECONVOLUTION

CROSS-REFERENCE TO RELATED APPLICATIONS

This application claims the benefit of U.S. provisional patent application Ser. No. 60/488,325, filed Jul. 18, 2003, and incorporated herein by reference.

STATEMENT REGARDING FEDERALLY SPONSORED RESEARCH OR DEVELOPMENT

This invention was made with government support under grants 5R01CA66184, 1R21DK63692 and 5R21HL67387. The government has certain rights in the invention.

BACKGROUND OF THE INVENTION

1. Field of Invention

The invention relates generally to a technique for correcting data obtained from a system, for which measurements obtained from the system are nonlinear functions of its interior properties, to remove blurring effects that are introduced during reconstruction processing of the data. In a particular implementation, the invention relates to deblurring of image data obtained using optical diffusion tomography.

2. Description of Related Art

Various techniques have been developed for processing data in image processing and other fields. For example, researchers in the field of diffuse optical tomography (DOT) had always assumed, explicitly or implicitly, that the major source of inaccuracies in the reconstructed images, especially for first order solutions, come from the non-linear dependence of measurement data on the medium's optical properties. DOT involves inserting energy such as light energy into a target medium such as human tissue and measuring the energy as it emerges from the medium. The energy is scattered in the medium due to varying optical properties in the medium, such as absorption and scattering. The problem is to determine the optical properties of the medium based on the detected energy. However, since the detector readings are nonlinear functions of the absorption and scattering coefficients [1], a non-linear technique is conventionally called for to solve the inverse problem. In particular, non-linear, iterative techniques such as Newton-Raphson are intended to take account of the inherent nonlinearity of the medium-measurement relationship. Such techniques involve solving a system of linear equations by making an initial estimate regarding the properties of the target medium, and solving the equations to obtain an updated estimate, then repeating the process with the new updated estimate. While this approach can yield good results, the computational expense is quite significant.

Accordingly, there is a need for a new approach for correcting data from a system that has a non-linear medium-measurement relationship to remove blurring effects that are introduced during processing of the data, which addresses the above and other issues.

BRIEF SUMMARY OF THE INVENTION

The present invention provides a filter technique for correcting data from a system that has a non-linear medium-measurement relationship to remove blurring effects that are introduced during reconstruction processing of the data.

The success of the filter technique demonstrated below, which is linear and therefore exhibits low computational expense, suggests that the influence of nonlinearities between a target medium and measurement data, or other physical or mathematical systems on reconstructed images may not be as large a source of error as is the linear spatial convolution (blurring) effect caused by the algorithm that is used to reconstruct the data. Moreover, while the filter technique is discussed below in particular in relation to filtering of image data, the technique is also applicable to other physical problems such as detection of mines or navigational hazards in murky waters, and detection of objects hidden in or behind clouds, fog, or smoke. The technique is also applicable to other types of inverse problems including all types of energy propagation problems, system identification problems, and economic and financial predictions, among others. The technique is applicable to any physical or mathematical system that exhibits a non-linear relationship between system properties and measurement data, also referred to as a non-linear system.

In one aspect of the invention, a computer-implemented method for filtering data that is representative of a target system that exhibits a non-linear relationship between system properties and measurement data, includes: (a) defining a modeled system that exhibits a non-linear relationship between system properties and measurement data, (b) obtaining first output data from the modeled system that is a function of a property of the modeled system, (c) applying a reconstruction algorithm to the first output data to obtain first reconstructed data that identifies, with some inaccuracy, the property of the modeled system, and (d) defining a linear filter, based on the first reconstructed data and data that is known to accurately identify the property of the modeled system, which corrects the first reconstructed data so that it more accurately identifies the property of the modeled system.

In another aspect of the invention, a computer-implemented method for providing a library of filters for filtering data that is representative of a system that exhibits a non-linear relationship between system properties and measurement data, includes: (a) defining a plurality of modeled systems that exhibit a non-linear relationship between system properties and measurement data, (b) for each of the modeled systems, obtaining first output data from the respective modeled system that is a function of a property of the respective modeled system, (c) for each of the modeled systems, applying a reconstruction algorithm to the first output data to obtain first reconstructed data that identifies, with some inaccuracy, the property of the respective modeled system, and (d) providing the library of filters by providing, for each of the modeled systems, a linear filter, based on the first reconstructed data and data that is known to accurately identify the property of the respective modeled system, which corrects the first reconstructed data so that it more accurately identifies the property of the respective modeled system.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Because computation of image-enhancing filters in the time domain has not been previously described, we present a limited description of this below. Before doing so, however, it is useful to review the motivation behind the frequency encoding of spatial information (FESI) technique.

Almost any reconstruction method will yield an imperfect answer, especially in the case of limited views and first order solutions. Most common is the presence of image blurring resulting from effects of noise, ill-conditioning, ill-posedness, etc. A commonly employed strategy to improve solutions is use of iterative methods wherein the forward and inverse problem are alternately solved (e.g., Newton-Raphson method). For 3D problems involving large numbers of source-detector pairs, the computational effort needed to provide for such solutions can be burdensome, even with fast processors, and thoroughly impractical in the case of a time series. Recently, however, we have introduced a fast image recovery method that allows for 3D imaging in real time [2]. It has been our experience that in most cases the images obtained can clearly resolve internal features, especially their temporal properties, but image degradation due to edge blurring is evident. Common to many reconstruction methods is the absence of a way to quantitatively characterize the "information spread function" (ISF) associated with mapping of features from the object space to the image space. The ISF describes the spatial distribution of the target medium's properties in the reconstructed image.

Figure 1:
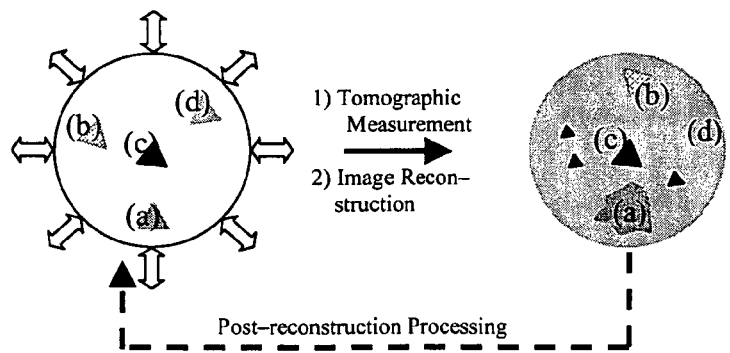
FIG. 1 illustrates a schematic of errors commonly seen in reconstructed optical images.

FIG. 1 illustrates a schematic of errors commonly seen in reconstructed optical images. A medium's properties can be inaccurately represented in the image domain in several ways. For example, depending on the reconstruction algorithm and complexity of the target medium, a perturbation in a given location may be (a) distorted in size and/or shape, (b) incorrectly located, (c) assigned to extra locations in addition to the correct location, or (d) smeared out over the area of the medium. Insight as to how these distortions in image quality occurred could be derived if there was some way to encode the information present in the object space and to decode this in the image space. Our approach to this has been to use the concept of frequency encoding of spatial information (FESI) used in magnetic resonance (MR) imaging and use this strategy to label information that is "transferred" from the object to image space.

In this approach, the optical parameters of each target medium volume element are tagged in some way to permit the computation of the ISF, which describes the spatial distribution of the target medium's properties in the reconstructed image. The method used here is to tag the properties of simulation media voxels by causing them to fluctuate at location-specific frequencies, and then locate and quantify the contribution of each voxel to the reconstructed image by means of either a Fourier transform or a temporal covariance computation. Implementation of this approach is practicable because of the availability of efficient methods for generating large numbers of forward and inverse problems in a short time, e.g., an order of magnitude $O(1\ s)$ for one forward-problem computation, and $O(10^{-3}\ s)$ for one inverse-problem solution.

Figure 2:
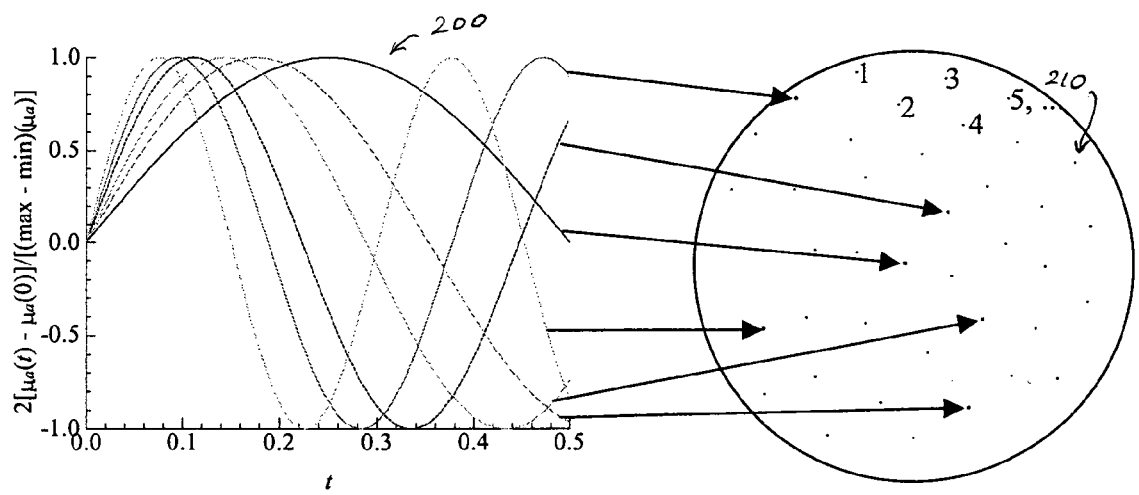
FIG. 2 illustrates the assignment of a frequency and phase to elements in a model of a target system, according to the invention.

FIG. 2 illustrates the assignment of a frequency and phase to elements in a model of a target system, according to the invention. The steps involved in a FESI calculation are as follows. First, distinct time-varying functions defined, e.g., by modulation frequency and an initial phase are assigned either to every finite element or every node of the frequency-encoded mesh (FEM) or other suitable mesh. The term "element" as used herein is meant to encompass one or more finite elements or one or more associated nodes. For example, sinusoids 200 whose amplitudes (AC) are equal to 2% of their mean (DC) values can be assigned. For presentation purposes, the sinusoids are shown as if they were in phase at time t=0, but in practice a unique random initial phase shift, e.g., between zero and $2\pi$, is assigned to each. A fixed numerical ordering is provided for the $N_p$ elements, such as example element 210, in the mesh. If one seeks to compute ISFs for absorption and scattering perturbations simultaneously, then two frequencies and two initial phases are assigned to each finite element or node.

Second, in a forward problem, a time series of N target medium states is generated, by sampling the sinusoids at a constant time interval $\Delta t$ until $N_t$ spatial distributions are recorded. The instantaneous values of the sinusoidal function (s) assigned to each node or finite element are used to determine the instantaneous value of one or both optical coefficients (e.g., $\mu_a(t_n) = \mu_{a,mean}[1+b\sin(2\pi f_{mod}n+\phi_{init})]$, where b is the modulation amplitude (and is optionally depth-dependent), which lies in the range $0.01 \leq b \leq 0.1$, and $t_n = n\Delta t$ with $n=0,2,\ldots,N-1$). $\mu_a$ is the absorption coefficient in the target medium. More generally, the instantaneous values of the sinusoidal function(s) determine the value of one or more properties of a target system. The value of $\Delta t$ is chosen so that the largest value of $f_{mod}$ is not aliased, and N must be large enough that the smallest inter-frequency difference can be resolved, e.g., $N>2\max(f_{mod})/\min(\Delta f_{mod})$. Third, for every medium state and all sources and detectors, a measurement is simulated by computing solutions to, in an example case, the photon diffusion equation, detailed further below. Fourth, in an inverse problem step, also detailed further below, every set of detector readings is used as inputs to the image reconstruction code, thus producing a time series of images of one or both optical coefficients. Fifth, in a post-processing step, the Fourier transform (FT) of the time series of reconstructed optical coefficient(s), $\mu_a(t_n)$, for every node is computed. Sixth, in another post-processing step, a spatial map of the FT amplitude, at all nodes, for any selected value of $f_{mod}$ shows precisely how that frequency, located at one precise location in the target medium, was mapped into the image domain by the measurement and reconstruction processes.

Figure 3A:
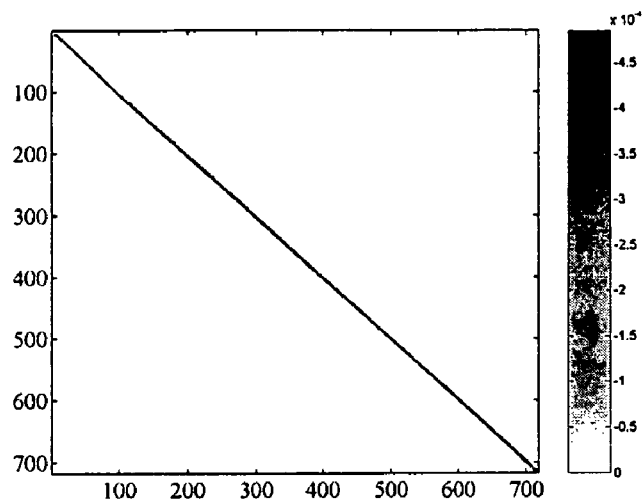
FIG. 3a illustrates a grayscale map showing the amplitude of each assigned modulation frequency (vertical axis) at each node (horizontal axis)
Figure 3B:
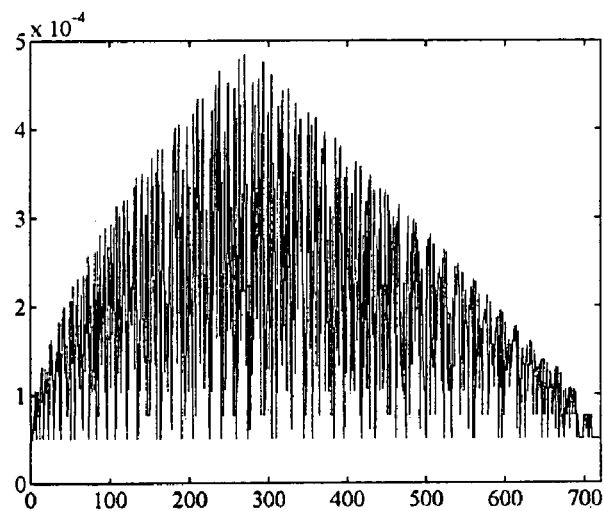
FIG. 3b illustrates an x-y plot of the numerical values along the main diagonal of the grayscale map in FIG. 3a, and FIG. 3c illustrates a grayscale map showing the amplitude of each recovered modulation frequency at each node in the image domain, according to the invention.
Figure 3C:
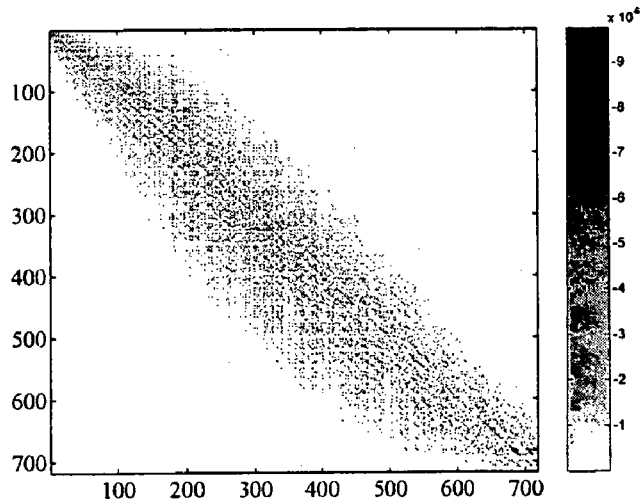

FIG. 3a illustrates a grayscale map showing the amplitude of each assigned modulation frequency (vertical axis) at each node (horizontal axis), FIG. 3b illustrates an x-y plot of the numerical values along the main diagonal of the grayscale map in FIG. 3a, and FIG. 3c illustrates a grayscale map showing the amplitude of each recovered modulation frequency at each node in the image domain, according to the invention. In particular, an example is provided of an ISF computation, for a 2-D FEM mesh containing 717 nodes (1368 finite elements). FIG. 3a illustrates a grayscale map showing the amplitude of each assigned modulation frequency (vertical axis) at each node (horizontal axis). Every row and column contains exactly one non-zero entry, i.e., each frequency resides at one and only one node. FIG. 3b illustrates an x-y plot of the numerical values along the main diagonal of the grayscale map in FIG. 3a. In this example the modulation amplitude is depth-dependent, increasing linearly from b=0.01 at the mesh boundary to b=0.1 at the center. FIG. 3c illustrates a grayscale map showing the amplitude of each recovered modulation frequency at each node in the image domain. Each row of this map is the ISF of the corresponding frequency.

It has turned out that working with the time series directly rather than with the frequency transforms yields much better results. In any case, getting the results at a series of time steps works, as the results presented subsequently will demonstrate. For simplicity, only cases in which the scattering coefficient $\mu_s$ is constant and known (a value of 10 cm$^{-1}$ was set) are considered, so that only $\mu_a$ needs to be examined. However, the technique is applicable as well to cases where $\mu_s$ varies, or more, generally to any target system in which one or more properties vary.

When the images of the spatial distributions of the medium properties at each of the Nt sample times are reconstructed, the original/true and the reconstructed spatial distributions of the medium optical parameters are accumulated in two $N_p \times N_t$ matrices, Y and X, respectively. The first principal assumption underlying the approach to image enhancement outlined in this invention is that optical parameter information that resides in an individual pixel of the medium is in some manner smeared out within the entire spatial domain of the reconstructed image. There is no spreading in the temporal dimension because the data from each time slice is processed independently of all the others. Both spatial and temporal convolution would have to be addressed if an algorithm that simultaneously processes data acquired over many time slices is used. The second assumption is that the contribution of any given medium element to each image element is the same at all times, which is a reasonable expectation if the magnitudes of the optical parameter fluctuations are not large. Then, these contributions can be determined by solving a linear system with $N_p$ unknowns: Y=XF, where F is a $N_p \times N_p$ matrix called the deconvolution operator or "filter," which contains the contribution of each medium element to all the image pixels.

Thus, we define a medium to consist of N voxels or elements with incommensurate sinusoidally-varying absorption coefficients. The forward calculation is done at T times that differ by a small fraction of the smallest oscillation period, but over many cycles of the longest period, and each forward calculation is inverted to give a calculated value of the cross section for each voxel. The input can be described by a set of quantities $y_{nt}$, where n is the voxel number and t the time index. This information can be collected in an N×T matrix Y. Similarly, the reconstructed Has can be described by quantities $x_{nt}$, which can be considered as elements of an N×T matrix X. The objective is to determine an N×N filter matrix F that transforms X back into Y. That is, we would like to solve the equation Y=FX. This F will subsequently be applied to reconstructed experimental images, in the hope of improving them. It is important to note here that the filter matrix F defined here and referred to subsequently is defined in the time domain and is not identical to the frequency-domain filter matrix F from the preceding paragraphs.

Now X and Y are in general not square matrices, as T>>N in the situations of interest, and so they cannot in general be inverted. In the results to follow there were 717 (2-D) or 982 (3-D) voxels and 16,384 ($2^{14}$) time steps. Then, in general, the equation Y=FX cannot hold. This situation is common in statistical problems. The matrix equation represents T linear equations in N unknowns, and unless the coefficients are linearly dependent in some way, there is no exact solution. So we try to make the difference Y-FX, e.g., the Frobenius norm, as small as possible, in the least squares sense. That is, we choose the elements $f_{nm}$ of F to minimize the quantity $$I = \sum_{t=1}^{T} \sum_{n=1}^{N} \left( y_{nt} - \sum_{m=1}^{N} f_{nm} x_{mt} \right)^2,$$

which gives the sum of the squares of the errors in the individual terms when Y is approximated by FX. That is, F is the transformation that yields the best possible approximation to Y as a linear combination of rows of X. Putting the derivative of I with respect to each element of F equal to zero gives $$\frac{\partial I}{\partial f_{nm}} = -2 \sum_{t=1}^{T} \left( y_{nt} - \sum_{m=1}^{N} f_{nm} x_{mt} \right) x_{mt} = 0$$

This is the matrix equation $YX^T = FXX^T$, where $X^T$ is the transpose of X. Since $XX^T$ is a square matrix and the columns of X are linearly independent, $XX^T$ can be inverted to give $F = (YX^T)(XX^T)^{-1}$. This is a linear regression procedure. Note that if the process is inverted, to produce the optimal approximation X=GY in the least squares sense, it is found that $G = (XY^T)(YY^T)^{-1}$, and in general F and G are not inverses of each other.

Figure 4:
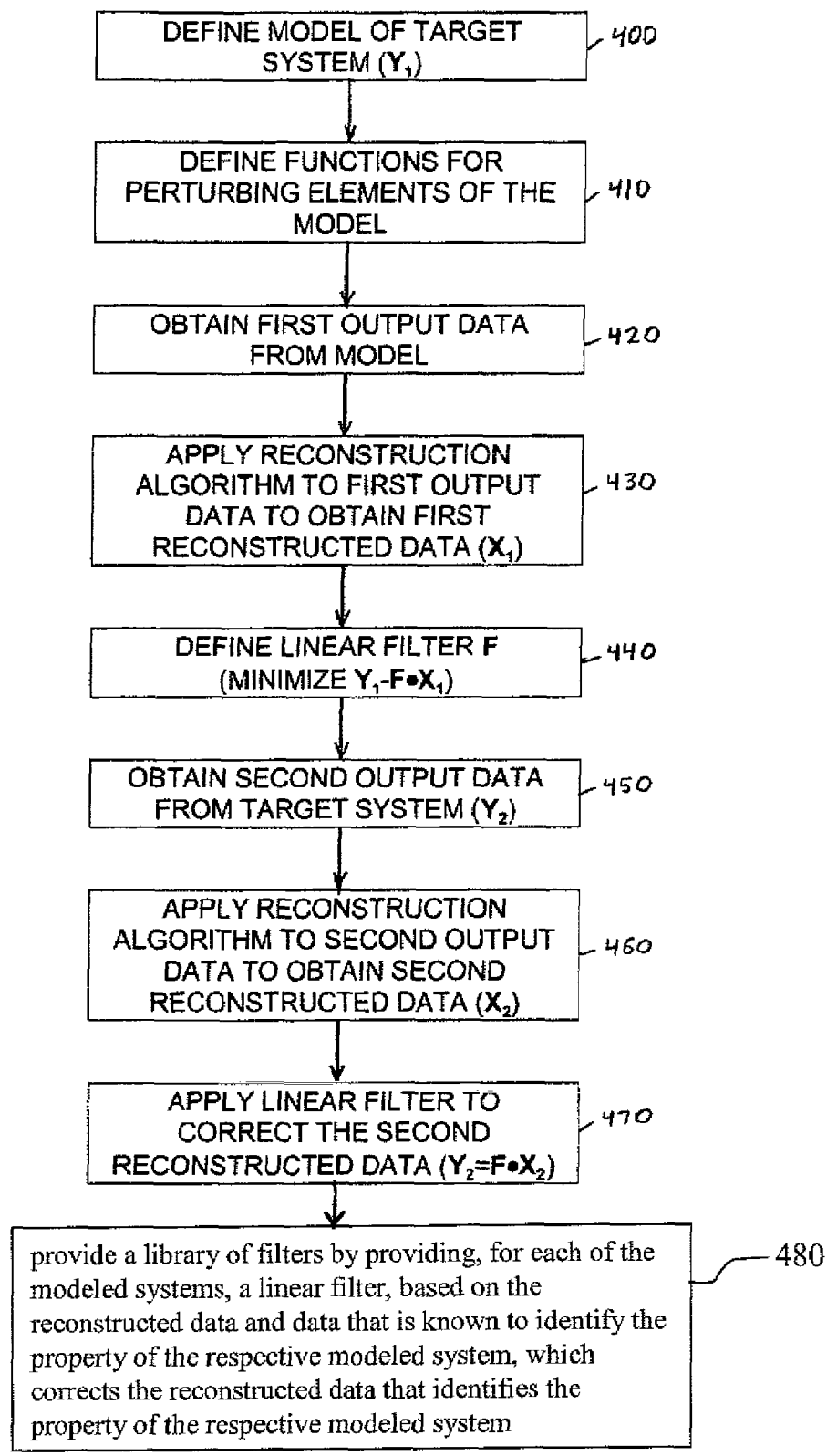
FIG. 4 illustrates a method for providing a linear filter for correcting reconstructed data from a target system, according to the invention.

An example process for providing the filter F can be summarized as follows. FIG. 4 illustrates a method for providing a linear filter for correcting reconstructed data from a target system, according to the invention. At block 400, a model of the target linear system is defined. The properties of the model are represented by the known matrix $Y_1$. At block 410, functions, such as sinusoids, are defined for perturbing elements of the model. At block 420, first output data is obtained from the model in response to the perturbed elements. At block 430, a reconstruction algorithm is applied to the first output data to obtained first reconstructed data, represented by the matrix $X_1$. At block 440, the linear filter F is defined by minimizing $Y_1 - F \cdot X_1$. At block 450, second output data is obtained from the target system. For example, this data can represent detector readings of light energy that is injected into a target medium such as tissue. At block 460, the reconstruction algorithm is applied to the second output data to obtain reconstructed data that represents properties of the target system. The unknown properties of the target system are represented by the matrix $Y_2$. At block 470, the filter is applied to correct the second reconstructed data, via the relation $Y_2 = F \cdot X_2$ so that it more accurately represents the target system.

Solution of Forward Problem

Tomographic data for the simulated tissue models were acquired by using the finite element method to solve the diffusion equation with Dirichlet boundary conditions for a DC source. For a spatial domain A with boundary AA, this is represented by the expression $$\nabla \cdot [D(r) \nabla \phi(r)] - \mu_a(r) \phi(r) = -\delta(r - r_s), \ r \in \Lambda,$$

where $\phi(r)$ is the photon intensity at position r, $r_s$ is the position of a DC point source, and D(r) and $\mu_a(r)$ are the position-dependent diffusion and absorption coefficients, respectively. Here the definition used for the diffusion coefficient was $D(r) = 1/\{3[\mu_a(r) + \mu'_s(r)]\}$, where $\mu'_s(r)$ is the position-dependent scattering coefficient. For all computations considered in this report, all media had spatially homogeneous and temporally invariant scattering. The value of the scattering coefficient was $\mu'_s = 10 \ cm^{-1}$.

Imaging operators were computed for each source-detector channel. In brief, each row of the matrix $W_r$ (see below) is a function of two forward-problem solutions: a product of forward and adjoint intensities for perturbations of $\mu_a$, and a dot product of forward and adjoint intensity gradients for perturbations of D. For each combination of medium geometry and source-detector (S-D) configuration, a single set of imaging operators was used for all inverse problem computations. These were computed for a homogeneous reference medium having the same shape, size, and measurement geometry as the (heterogeneous) target, and optical parameters equal to the mean values of those in the target.

Solution of Inverse Problem

The reconstruction algorithm that was used to generate the results presented herein seeks to solve a modified perturbation equation whose form is $$W_r \cdot \delta x = \delta I_r,$$

where: $\delta x$ is the vector of differences between the optical properties (e.g., absorption and scattering (diffusion) coefficients) of a target (measured) and a defined reference medium; $W_r$, the imaging operator or weight matrix, is the weight matrix describing the influence that each voxel has on the surface detectors for the selected reference medium; and $\delta I_r$ is proportional to the difference between detector readings obtained from the target in two distinct states (e.g., the difference between data collected at two different instants, or the difference between instantaneous and time-averaged data).

The distinction between the above equation and a standard linear perturbation equation lies in the structure of the right-hand side. Here we used the normalized difference method (NDM) (described in U.S. patent application publication no. 2004/0010397, published Jan. 15, 2004, entitled "Modification Of The Normalized Difference Method For Real-Time Optical Tomography", incorporated herein by reference), in which the right-hand side of the equation is defined by $$(\delta I_r)_i = \frac{(I - I_0)_i}{(I_0)_i} (I_r)_i,$$

Here, $I_r$ is the computed detector readings corresponding to a selected reference medium. For the filter-generating computations, I and $I_0$ represent the intensity at a specific time point and the time-averaged intensity, respectively. For the filter-testing computations, I and $I_0$ are the intensities (i.e., detector readings) computed for the heterogeneous target medium and homogeneous reference medium, respectively.

A Levenberg-Marquardt (LM) algorithm was used to compute numerical solutions to the modified perturbation equation. In these computations, the $\delta x$ that was solved for included position-dependent perturbations in both $\mu_a$ and D. No use was made of any a priori information regarding the spatial distributions of either coefficient. Thus the number of unknowns in each inverse problem computation was twice the number of mesh nodes $N_p$. Accordingly, the dimensions of the quantities in the modified perturbation equation are $N_c \times$ ($2N_p$), where $N_c$ is the overall number of source-detector (S-D) channels, for $W_r$, $N_c \times 1$ for $\delta I_r$, and ($2N_p$)$\times 1$ for $\delta x$.

Target Media

Figure 5A:
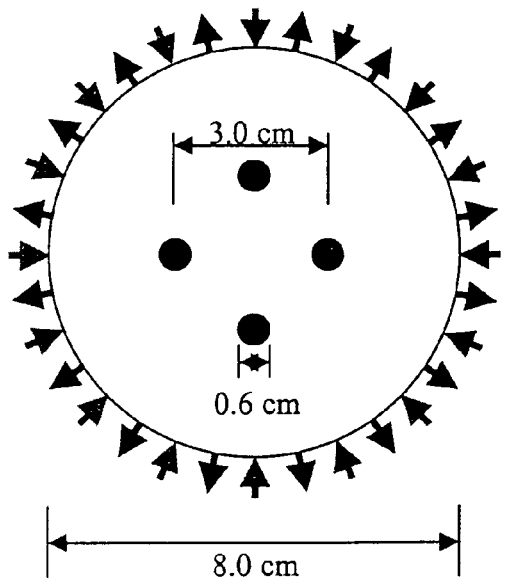
FIGS. 5a and 5b illustrate circular target media and source-detector configurations for a full tomographic measurement and a limited view, backscattering tomographic measurement, respectively.
Figure 5B:
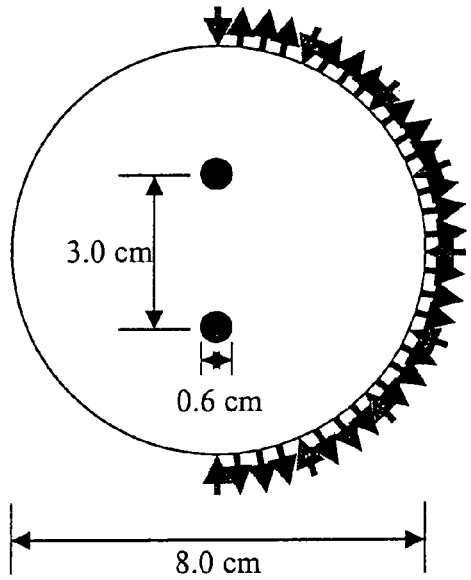
Figure 5C:
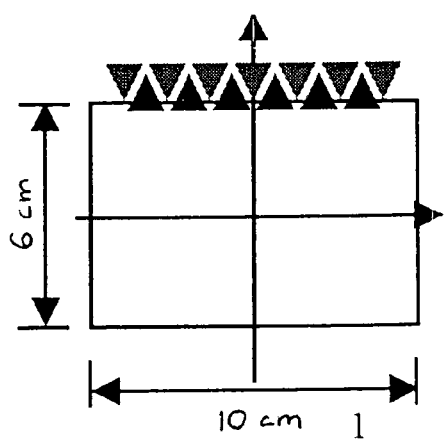
FIGS. 5c and 5d illustrate rectangular target media and source-detector configurations for a limited view, backscattering tomographic measurement, and a limited view, transmission tomographic measurement, respectively.
Figure 5D:
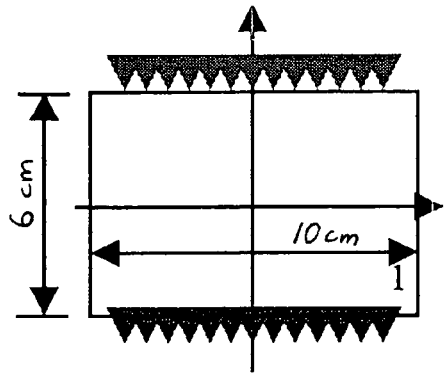

2-D target media that were used to test the filter matrix derived by following the procedure outlined here are shown schematically in FIGS. 5a-d. 3-D media were also used as discussed further below. In particular, FIGS. 5a and 5b illustrate a circular target media and source-detector configuration for a full tomographic measurement and a limited view, backscattering tomographic measurement, respectively. FIGS. 5c and 5d illustrate a rectangular target media and source-detector configuration for a limited view, backscattering tomographic measurement, and a limited view, transmission tomographic measurement, respectively. The rectangular target media is 6 cm×10 cm.

Medium geometries and source-detector (S-D) configurations used for forward-problem computations, in both the filter generating and testing phases, are shown. In the case of a physical target medium undergoing optical tomography, for instance, the arrows pointing toward the target medium represent injected light energy from energy sources, while the arrows pointing away from the target medium represent the portion of the light energy that is detected by a detector after it is scattered by the target medium. However, more generally, the arrows represent any physical or mathematical input or output of a physical or mathematical system. Note that the indicated source and detector locations are only suggestive, and exact numbers and patterning account for factors such as whether the source (S) and detector (D) are co-axial, or alternating S-D-S-D, and so forth.

The target media of FIGS. 5a and 5b are both 8-cm-diameter, circular regions with homogeneous optical coefficients, except for certain identical inclusions located symmetrically about the center, which are stronger absorbers than the background. The background scattering and absorption coefficients are $\mu_s = 10$ cm$^{-1}$ and $\mu_a = 0.05$ cm$^{-1}$, respectively. The absorption coefficients of the inclusions were 20%, 100%, 300%, or 700% larger than those of the background medium. In the full-tomographic case of FIG. 5a, there are four inclusions, each 0.6 cm in diameter and centered 1.5 cm from the center of the circle. There are sixteen sources and sixteen detectors located at equal angular intervals around the circumference, with alternating sources and detectors. The limited-view case of FIG. 5b contains two inclusions. There are nine sources located at constant angular intervals about only half of the circumference. Three detectors are placed at uniform angular intervals between each pair of adjacent sources, for a total of twenty-four detectors. The interest in this situation is that often only partial views are available, for instance in optical imaging of the breast or of the head.

Example Imaging System

Figure 6:
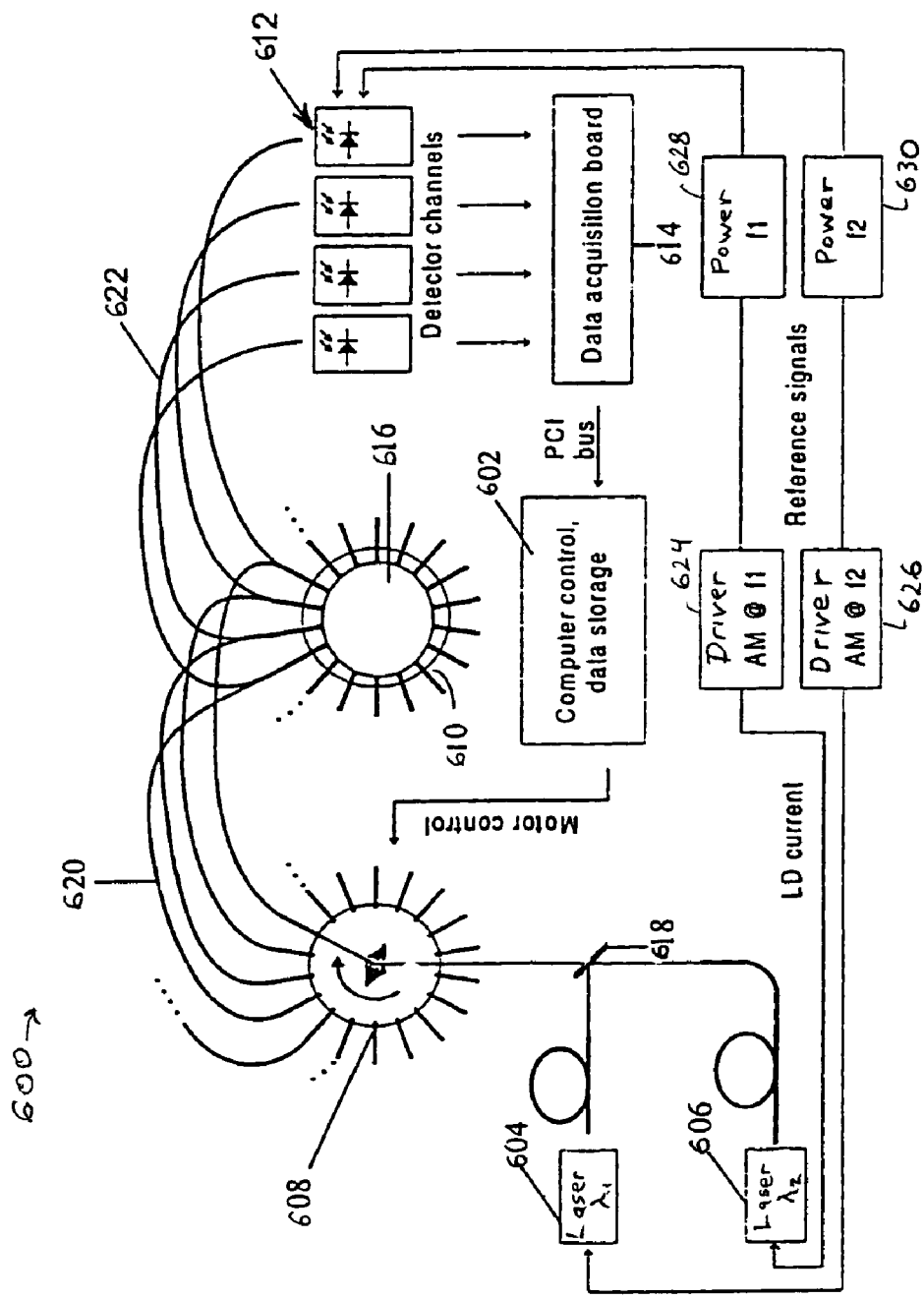
FIG. 6 illustrates an example imaging system, according to the invention.

FIG. 6 illustrates an example imaging system, shown generally at 600. A system providing high speed data capture of one or more wavelengths simultaneously from a target medium using optical tomography is disclosed in PCT publication WO 01/020306, published Mar. 22, 2001, and entitled "System And Method For Tomographic Imaging Of Dynamic Properties Of A Scattering Medium", incorporated herein by reference. This system is capable of capturing multiple wavelength data at rates up to 150 Hz and enables the reconstruction of cross-sectional images of real-time events associated with vascular reactivity in a variety of tissue structures (e.g., limbs, breast, head and neck). Fast data collection methods are particularly useful because there are many disease states with specific influences on the spatial-dynamic properties of vascular responses in hemoglobin states.

The system 600 includes a computer control and data storage component 602. This component can be provided by a general-purpose computer, for example, which includes a processor for executing software instructions that are stored in a memory. The memory can be considered a program storage device that stores such instructions. Energy sources such as laser diodes 604, 606 operate at respective different wavelengths 11 and 12, such as near-infrared wavelengths, and are driven by respective drivers 624, 626, which use amplitude modulation to provide a laser diode (LD) current to the laser diodes 604, 606. The drivers 624, 626 are powered by power sources 628, 630, respectively. A target medium 616 placed in an imaging head 610 is exposed to optical energy from sources 604, 606. The optical energy originating from energy sources 604, 606, is combined by beam splitter 618 and delivered to a source demultiplexer 608. The source demultiplexer 608 is controlled by the computer 602 to direct the optical energy to source fibers 620 sequentially. Although two energy sources 604, 606 are shown in this embodiment, an additional number of energy sources, each having different wavelengths can be employed. Moreover, a single variable wavelength energy source can be implemented.

Each source fiber 620 carries the optical energy from the demultiplexer 608 to the imaging head 610 where the optical energy is directed into the target medium 616. The imaging head 610 contains a plurality of source fibers 620 and detector fibers 622 for transmitting and receiving light energy, respectively. Each source fiber 620 forms a source-detector pair with another detector fiber 622 in the imaging head 610 to create a plurality of source-detector pairs. The optical energy entering the target 616 at one location is scattered and can emerge at any location around the target 616. The emerging optical energy is collected by detector fibers 622 mounted in the imaging head 610, which carry the emerging energy to a number of single-channel photodetectors 612, which, in turn, measure the energy density, e.g., amplitude, of the collected optical energy and generate a corresponding signal. A data acquisition board 614 receives signals from the detector channels 612 indicating the energy density, separates them by wavelength, and samples and holds the separated signals for delivery to the computer 602. The computer 602 in turn reads and stores the signal for use in image reconstruction and other analysis as discussed herein. The computer can be programmed with an image reconstruction algorithm for reconstructing an image from the measured outputs of the system, as well as a filter for correcting the reconstructed data, as discussed herein.

Using the techniques described, a series of image enhancement studies were performed involving simulated media. The specific issues that were examined include the impact on image quality of: varying the number of sources and detectors; the measurement geometry (full tomographic vs. limited views); the number of pixels in the inverse problem mesh; the number and size of regions containing optical parameter values different from those of the background (i.e., "inclusions"); the distance separating multiple inclusions and their distance from the medium boundary; the quantitative inclusion-vs.-background optical parameter contrast; and the external geometry of the medium (circular vs. rectangular). Also studied was the effect of discrepancy between the bulk optical parameters of the media used in deriving a deconvolution operator and those of the target medium to which it subsequently is applied. The quality of the images, both before and after applying the spatial deconvolution, was quantified by means of several local (e.g., coordinates of inclusion center, inclusion full width at half maximum (FWHM)) and global (e.g., spatial correlation and root mean squared difference between medium and image) indices of reconstruction accuracy. Both 2D and 3D media were studied.

Results

Figure 7:
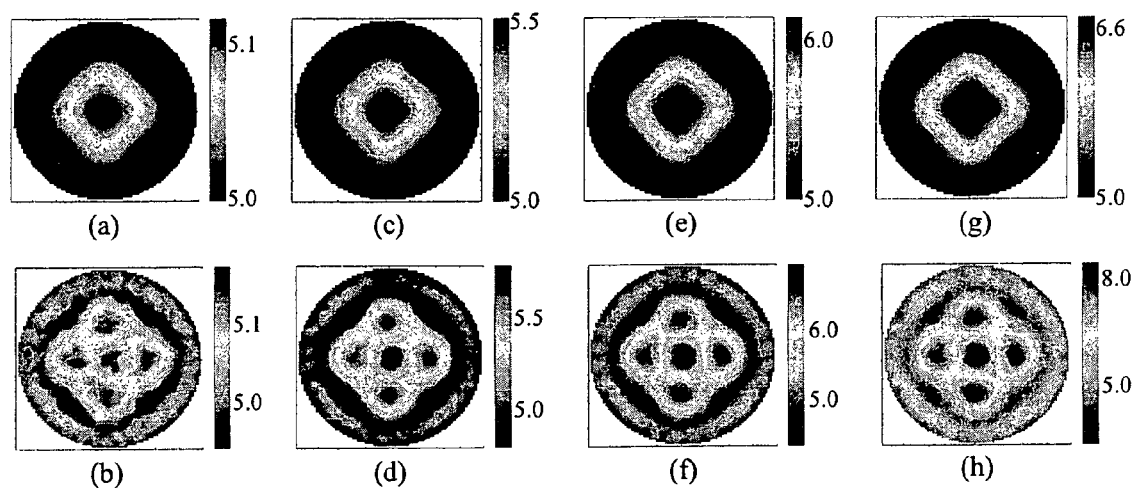
FIGS. 7a, 7c, 7e and 7g illustrate reconstructed images without filtering, for the four-inclusion full view arrangement of FIG. 5a with different inclusion absorption coefficient values, and FIGS. 7b, 7d, 7f and 7h, respectively, illustrate the corresponding reconstructed images with filtering according to the invention.

FIGS. 7a, 7c, 7e and 7g illustrate reconstructed images without filtering, for the four-inclusion full view arrangement of FIG. 5a with different inclusion absorption coefficient values, and FIGS. 7b, 7d, 7f and 7h, respectively, illustrate the corresponding reconstructed images with filtering according to the invention. In particular, reconstructed images are shown for inclusion $\mu_a$ values of 0.06 cm$^{-1}$ (FIGS. 7a and 7b), 0.10 cm$^{-1}$ (FIGS. 7c and 7d), 0.02 cm$^{-1}$ (FIGS. 7e and 7f), and 0.04 cm$^{-1}$ (FIGS. 7g and 7h). In each case, the background $\mu_a$=0.05 cm$^{-1}$. The quantity displayed on colorbars is $\mu_a \times 100$.

The spatial distributions of $\mu_a$ for the reconstructed images using the full-tomographic measurement geometry and the four different levels of absorption contrast, without filtering, are shown in the top row. The images in the bottom row, also showing the spatial distributions of $\mu_a$, demonstrate the image-enhancing (spatial deconvolution) effect of the filter matrix F after it is applied to the uncorrected reconstructed images. Comparison reveals that whereas the first-order solution failed to resolve the four inclusions, application of the filtering scheme according to the invention markedly improved the resolution. In other results not shown, it has been found that essentially the same type and extent of image quality improvement was obtained in full tomographic studies that employed either twice as many or only half as many sources and detectors, e.g., 32×32 or 8×8, so that the number of source-detector channels increased or decreased by a factor of four compared to the results in FIG. 7.

Figure 8:
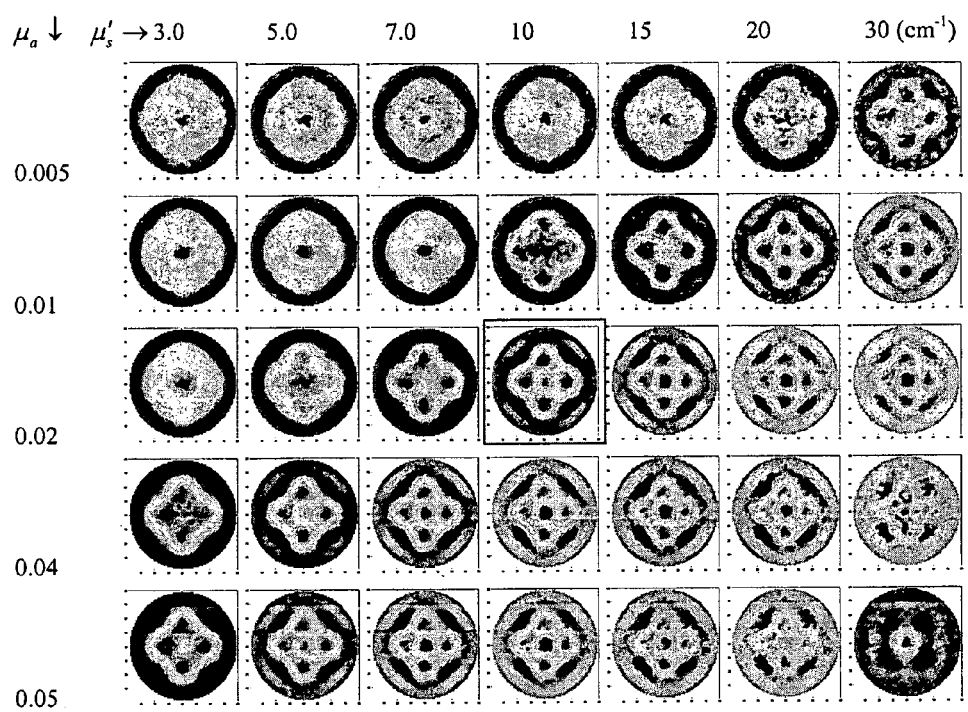
FIG. 8 illustrates corrected images of a target medium, where different combinations of background absorption coefficient $\mu_a$ and scattering coefficient $\mu_s$; were set in a simulation, according to the invention.
Figure 9:
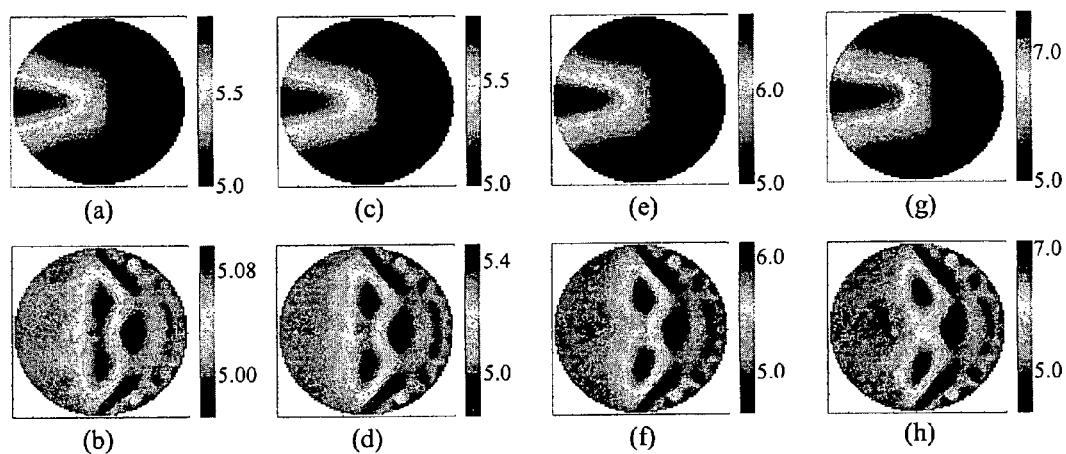
FIGS. 9a, 9c, 9e and 9g illustrate reconstructed images without filtering, for the two-inclusion, limited view arrangement of FIG. 5b with different inclusion absorption coefficient values, and FIGS. 9b, 9d, 9f and 9h, respectively, illustrate the corresponding reconstructed images with filtering according to the invention.

The robustness property of the filtering operation is demonstrated by the results shown in FIG. 8. FIG. 8 illustrates corrected images of a target medium, where different combinations of background absorption coefficient and scattering coefficient were set in a simulation, according to the invention. The corrected images produced by applying an image-enhancing filter that was generated from simulations on a target medium whose properties were $\mu_a$=0.02 cm$^{-1}$, $\mu_s$=10 cm$^{-1}$ to images reconstructed from 56 sets of detector readings obtained from test media whose background $\mu_a$ values ranged from 0.005 cm$^{-1}$ to 0.2 cm$^{-1}$ and whose background $\mu_s$ values ranged from 3 cm$^{-1}$ to 30 cm$^{-1}$. In each test medium $\mu_s$ was spatially homogeneous and $\mu_a$ in the four inclusions was twice the background value.

Tomographic measurements were simulated for 56 target media, all having the same internal geometry as that in FIG. 5a, but each having a different combination of background (bg) optical coefficient values $\mu_{a,bg}$ and $\mu_{s,bg}$. This study was carried out because, in practice, one can expect a mismatch between the true background optical properties of the target and those used as the initial guess for the image reconstruction algorithm. In every case, the four inclusions had $\mu_a$=2$\mu_{a,bg}$ and $\mu'_s$=$\mu_{s,bg}$. Also, in every case, the reconstructed image was corrected by applying a filter generated from data obtained from a target medium whose mean optical coefficient values were $\mu_a$=0.02 cm$^{-1}$, $\mu_s$=10 cm$^{-1}$. The single case for which the filter optical coefficients matched those of the test medium is indicated by the central image, which is surrounded by a darkened square. Inspection of the other 55 results reveals, however, that the same filter had beneficial effects in a significant percentage of cases. These run in a broad swath from the lower left to the upper right, and include cases wherein both $\mu_a$ and $\mu_u$ differed appreciably from those of the filter.

FIGS. 9a, 9c, 9e and 9g illustrate reconstructed images without filtering, for the two-inclusion, limited view arrangement of FIG. 5b with different inclusion absorption coefficient values, and FIGS. 9b, 9d, 9f and 9h, respectively, illustrate the corresponding reconstructed images with filtering according to the invention. This figure is a demonstration of the image-enhancing (spatial deconvolution) effect of the filter matrix F. Reconstructed images of two-inclusion, limited-view (FIG. 5b) target media are shown, for inclusion $\mu_a$ values of 0.06 cm$^{-1}$ (FIGS. 9a and 9b), 0.10 cm$^{-1}$ (FIGS. 9c and 9d), 0.02 cm$^{-1}$ (FIGS. 9e and 9f) and 0.04 cm$^{-1}$ (FIGS. 9g and 9h), with a background $\mu_a$=0.05 cm$^{-1}$. The images produced by applying the filter matrix to the results in the top row are shown in the second row. The images show the spatial distribution of $\mu_a$. The quantity displayed on the colorbars is $\mu_a \times 100$. It is noteworthy that without the filter, only the symmetry with respect to a horizontal diameter is seen. The other features are simply due to the placement of the sources and detectors on the right side of the medium: the computed absorptions are much higher on the side far from the sources and detectors.

Figure 10:
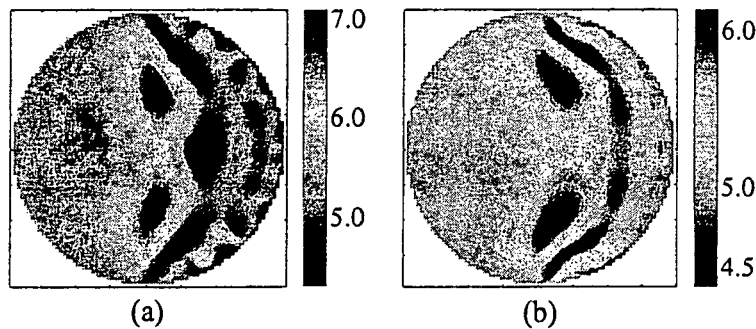
FIG. 10a illustrates a reconstructed image with filtering according to the invention, for the two-inclusion, limited view arrangement of FIG. 5b.
FIG. 10b illustrates the corresponding reconstructed image without filtering, after fifty cycles of a Born iterative reconstruction algorithm, according to the invention.

FIG. 10a illustrates a reconstructed image with filtering according to the invention, for the two-inclusion, limited view arrangement of FIG. 5b, and FIG. 10b illustrates the corresponding reconstructed image without filtering, after fifty cycles of a Born iterative reconstruction algorithm. In both cases, inclusion $\mu_a$ values of 0.04 cm$^{-1}$ and background $\mu_a$=0.05 cm$^{-1}$ applied. The quantity displayed on the colorbars is $\mu_a \times 100$. To bring out even more strongly the advantages of using the filter, a comparison between the effects of applying the filter to a first-order image and of using a Born iterative algorithm are presented. FIG. 10a reproduces the result of FIG. 9h, in a larger size. The image in FIG. 10b is the Born iterative result after fifty iterations. The two results look qualitatively similar, but in reality the result in FIG. 10a, with the filter, is altogether superior since it is much more symmetric about a vertical diameter, the inclusions are accurately located, in contrast to the iterative result of FIG. 10b, and the resolution is better. Further, calculation of the fifty iterations took about three hours on the desktop computer used, and it all had to be done after the experiment (here a simulation). Calculation of the filter is faster, though of the same order of magnitude, but post-processing requires only about 100 ms on the same computer.

Figure 11:
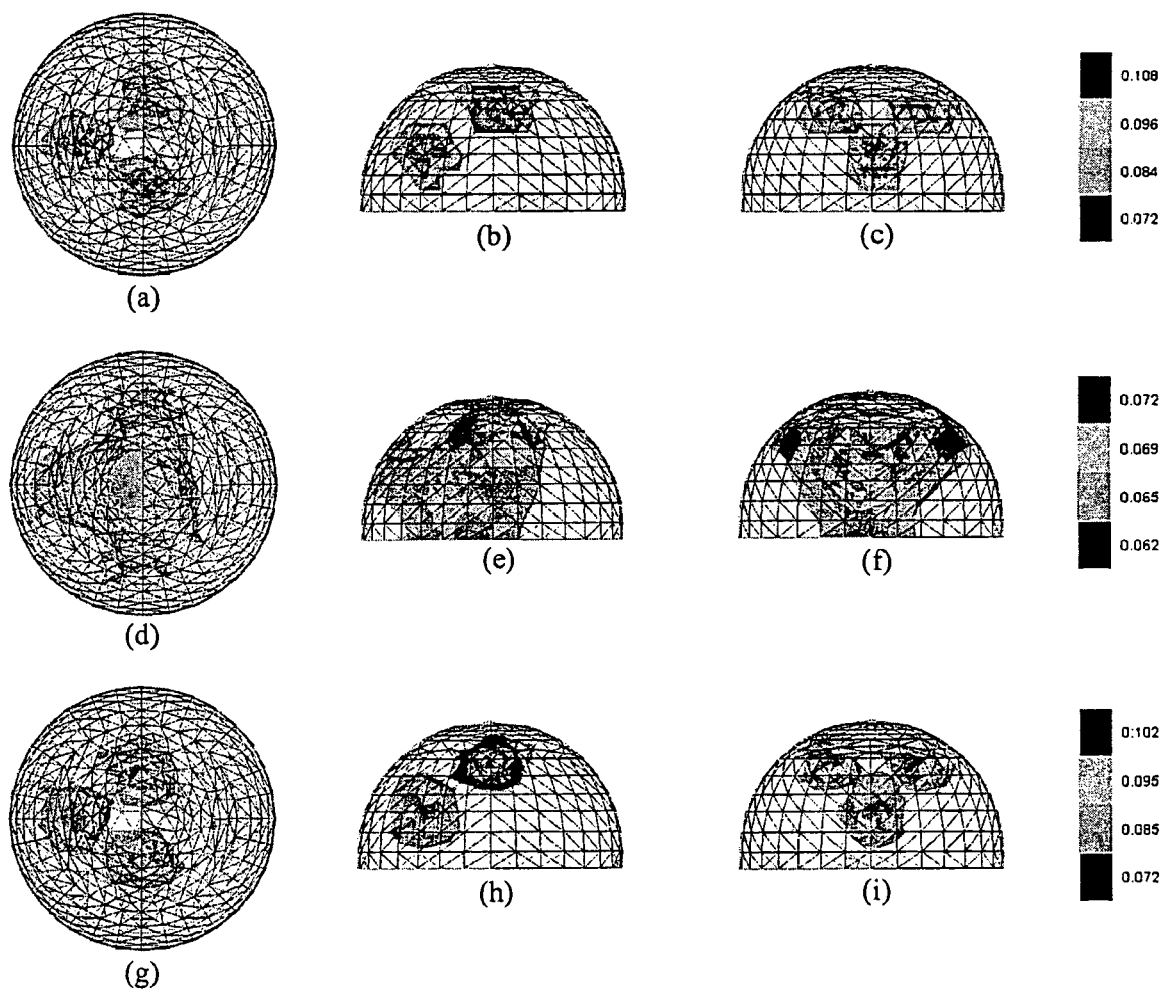
FIGS. 11a, 11b and 11c illustrate mutually orthogonal views of a three-dimensional hemisphere with three inclusions, FIGS. 11d, 11e and 11f, respectively, illustrate a corresponding target medium, with reconstructed images without filtering.
FIGS. 11g, 11h, and 11i, are corresponding reconstructed images with filtering according to the invention.

FIGS. 11a, 11b and 11c illustrate mutually orthogonal views of a three-dimensional hemisphere with three inclusions, FIGS. 11d, 11e, and 11f, respectively, illustrate corresponding reconstructed images without filtering, and FIGS. 11g, 11h, and 11i, respectively, illustrate corresponding reconstructed images with filtering according to the invention. In particular, FIGS. 11a, d, g; b, e, h; c, f, i illustrate x-y, x-z, and y-z views, respectively, of a static 3-D target medium, containing three $\mu_a$=0.12 cm$^{-1}$ inclusions embedded in a $\mu_a$=0.06 cm$^{-1}$ background, where $\mu_s$=10 cm$^{-1}$ throughout hemisphere. Following the initial tests of the filtering strategy, a three-dimensional simulation study was undertaken, in which the target medium was a hemisphere (i.e., a simple approximation to the geometry of a human breast) containing three static inclusions in which the absorption coefficient was twice that of the background medium. The first row shows the target medium. The corresponding views of the first-order Born reconstructed image and of the filter-enhanced image are shown in the second and third rows, respectively. Inspection shows that the first-order solution (FIGS. 11d-f) fails to clearly resolve the three inclusions. In contrast, the images obtained after the filter correction (FIGS. 11g-i) are almost identical to the originals, both in terms of object location and in recovered coefficient value.

Figure 12:
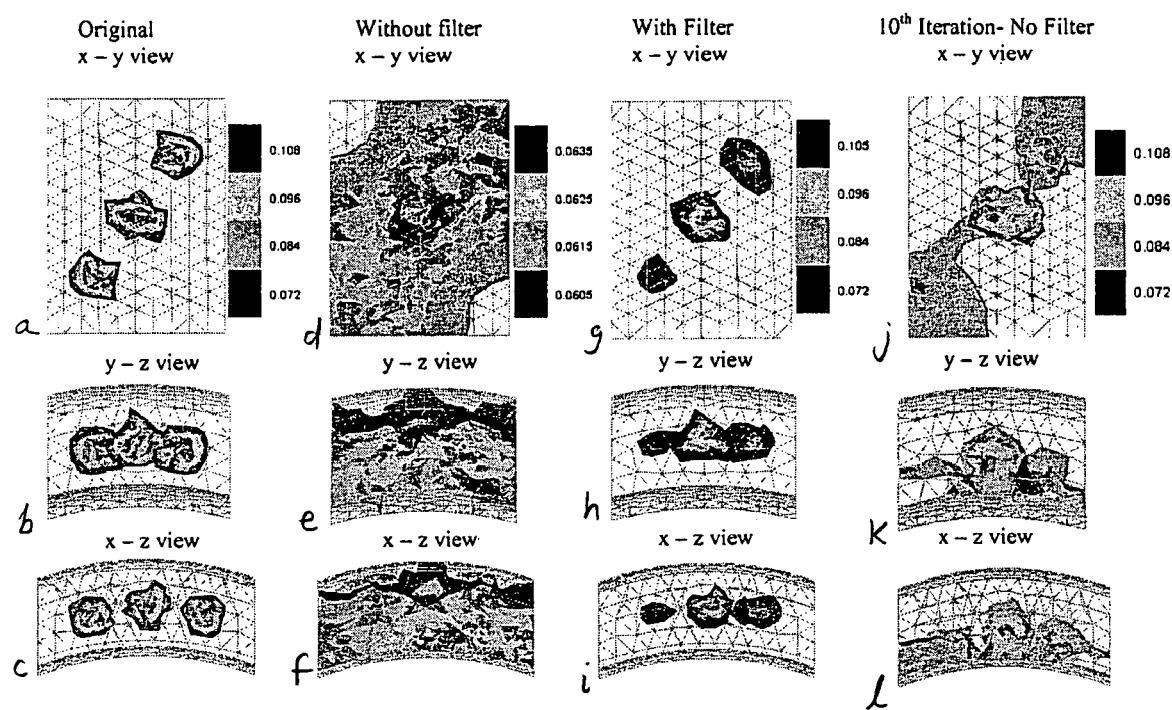
FIGS. 12a, 12b, and 12c illustrate mutually orthogonal views of a target medium having an external geometry similar to the curvature of the forehead, and having three inclusions, using a back reflection or backscattering tomographic measurement.
FIGS. 12d, 12e, and 12f are corresponding reconstructed images without filtering.
FIGS. 12g, 12h, and 12i, are corresponding reconstructed images with filtering.
FIGS. 12j, 12k, and 12l, are corresponding reconstructed images obtained using a recursive-iterative solver, according to the invention.

FIGS. 12a, 12b, and 12c illustrate mutually orthogonal views of a target medium having an external geometry similar to the curvature of the forehead, and having three inclusions, using a back reflection or backscattering tomographic measurement, FIGS. 12d, 12e, and 12f, respectively, illustrate corresponding reconstructed images without filtering, FIGS. 12g, 12h, and 12i, respectively, illustrate corresponding reconstructed images with filtering, and FIGS. 12j, 12k, and 12l, respectively, illustrate corresponding reconstructed images obtained using a recursive-iterative solver, according to the invention. These results show another example of application of the filtering technique to a 3D problem, but here we consider the more general case of imaging based on backreflection measurements only. The target is a 3D volume having an external geometry similar to the curvature of the forehead. Included are three objects whose absorption contrast is twice the background. Simulated tomographic measurements were made using sources and detectors uniformly positioned in a 4×6 array on the external surface. Shown (proceeding from left to right, column-wise) are different views of the ideal model, a first-order reconstructed image without filtering, results produced by applying the filter to the preceding image, and results obtained without the filter but following ten iterations using a recursive-iterative solver.

Inspection shows that the filtering scheme is clearly superior to the quality of the image produced without filtering and even superior to results obtained using a recursive iterative solver (Levenberg Marquart method). Its worth noting that the computational effort for the latter required nearly three hours of computing time using a 2.5 GHz processor whereas the results obtained with the filtering scheme required less than 0.1 seconds.

Quantification of Reconstructed Image Quality/Accuracy

Figure 13:
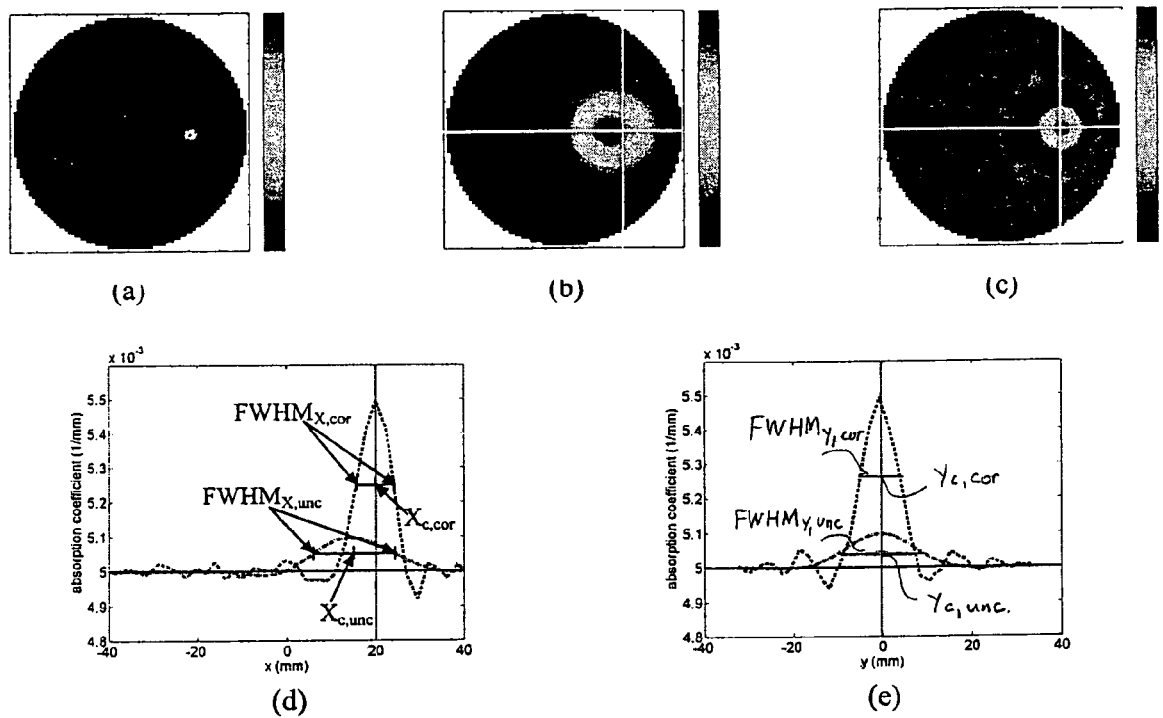
FIG. 13a illustrates an off-center inclusion consisting of a single mesh node in a target medium.
FIG. 13b illustrates a reconstructed image without filtering.
FIG. 13c illustrates a reconstructed image with filtering.
FIG. 13d illustrates a reconstructed absorption coefficient value versus horizontal (x) position for the images of FIGS. 13b and 13c.
FIG. 13e illustrates a reconstructed absorption coefficient value versus vertical (y) position for the images of FIGS. 13b and 13c, according to the invention.

For a simulation study in which the inclusion consisted of a single FEM mesh node, the qualitative accuracy of the recovered images, before and after application of the spatial deconvolution step, was assessed by computing two "local" indices of agreement between image and target medium: the inclusion's full-width, half maximum (FWHM), and the absolute error in the coordinates of its center $(X_c, Y_c)$. The manner in which these quantities are defined is illustrated in FIG. 13.

FIG. 13a illustrates an off-center inclusion (20 mm off-center) consisting of a single mesh node in a target medium, FIG. 13b illustrates a reconstructed image without filtering, FIG. 13c illustrates a reconstructed image with filtering, FIG. 13d illustrates an absorption coefficient value versus horizontal (x) position for the images of FIGS. 13b and 13c, and FIG. 13e illustrates an absorption coefficient value versus vertical (y) position for the images of FIGS. 13b and 13c, according to the invention. In particular, FIG. 13b shows the spatial distributions of $\mu_a$ in a selected target medium, in the image reconstructed by solving the modified perturbation equation, and FIG. 13c shows the corresponding information in the corrected image that is obtained by applying the filter F, respectively. Note that the center of the inclusion is shifted to the left for the unfiltered image of FIG. 13b, while the filtered data of FIG. 13c yields an accurate result. The curves plotted in FIGS. 13d and e are the recovered $\mu_a$ along the one-dimensional sections shown as white solid lines in FIGS. 13b and c; the white lines intersect at the known coordinates of the mesh node with elevated $\mu_a$. In FIGS. 13d and e, the curve with the higher peak represents the recovered $\mu_a$ for the filtered or corrected (cor.) data of FIG. 13c, while the curve with the lower peak represents the recovered $\mu_a$ for the unfiltered or uncorrected (unc.) data of FIG. 13b. In FIG. 13d, it can be seen that the error in the horizontal coordinate for the uncorrected data, $X_{c,unc}$ is about 5 mm.

Final Observations

It has been seen that the linear filter described herein is superior to non-linear approaches, such as the Born iterative approach. However, it is also possible to implement a successive approximation procedure starting from the filtered result rather than from first-order image. That is, one can combine the linear filtering and Born iterative strategies, by filtering each inverse-problem solution before computing the next forward-problem solution. One might hope that this will give much better answers yet, although at the cost of sacrificing the real advantage of almost zero post-processing time.

Also, we envision building a library of filter matrices for a large number of situations, so that in a clinical situation we can hope to find one that fits the experimental situation rather closely. This step is shown in FIG. 4 at 480. The filter matrices can be pre-calculated for different models. For example, for breast imaging, a library of filter matrices can be developed for different breast geometries as the modeled systems. The particular filter which is based on a geometry that best matches the actual geometry of a patient can then be selected. The actual geometry can be measured manually or automatically. For manual measurement, a computer-implemented user interface can be provided that prompts the user to enter the measurements, and a program in turn selects the best filter from the library for use in correcting image data that is subsequently obtained from the patient. In particular, one of the filters in the library is selected for filtering reconstructed data from the target system, e.g., the patient's breast, according to which of the modeled systems most closely matches the target system.

REFERENCES

[1] H. L. Graber, R. Aronson, and R. L. Barbour, "Nonlinear effects of localized absorption perturbations on the light distribution in a turbid medium," *J. Optical Society of America America, vol.* 15, pp. 838-848 (1998), incorporated herein by reference.

[2] Y. Pei, H. L. Graber, and R. L. Barbour, "A fast reconstruction algorithm for implementation of time-series DC optical tomography," in *Optical Tomography and Spectroscopy of Tissue V (Proceedings of SPIE, Vol.* 4955), B. Chance, R. R. Alfano, B. J. Tromberg, M. Tamura, E. M. Sevick-Muraca, Eds., pp. 236-245 (2003), incorporated herein by reference.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A computer-implemented method for filtering data that is representative of a target system that exhibits a non-linear relationship between system properties and measurement data to provide a reconstructed representation of the target system, comprising:

defining a modeled system that exhibits a non-linear relationship between system properties and measurement data;

defining one or more functions for perturbing one or more elements of the modeled system;

obtaining first output data in a form of a first matrix from the modeled system that is a function of a property of the modeled system, in response to perturbing the one or more elements;

employing a computer, applying a reconstruction algorithm to the first output data to obtain first reconstructed data in a form of a second matrix that identifies, with inaccuracy, the property of the modeled system;

employing a computer, determining a linear filter in an N×N matrix form, wherein multiplication of said linear filter with said first reconstructed data generates an approximation to said first output data, and wherein N is equal to a number of elements of said modeled system;

obtaining second output data from the target system that is a function of a property of the target system that corresponds to the property of the modeled system;

employing a computer, applying the reconstruction algorithm to the second output data to obtain the second reconstructed data that identifies, with inaccuracy, the property of the target system; and employing a computer, applying the linear filter to said second reconstructed data to correct the second reconstructed data that represents the property of the target system.

2. The computer-implemented method of claim 1, wherein: the modeled system comprises a physical model.

3. The computer-implemented method of claim 1, wherein: the modeled system comprises a mathematical model.

4. The computer-implemented method of claim 1, further comprising:

defining data that identifies a plurality of distributions of the property of the modeled system among a plurality of elements of the modeled system, wherein the first output data is obtained for each of the plurality of distributions; and the first reconstructed data is obtained for each of the plurality of distributions.

5. The computer-implemented method of claim 1, further comprising:

applying a filter in conjunction with the linear filter to correct the second reconstructed data.

6. The computer-implemented method of claim 1, wherein: the linear filter is pre-calculated prior to the obtaining the second output data.

7. The computer-implemented method of claim 1, wherein: the target system comprises a scattering medium; and the obtaining the second output data comprises exposing the scattering medium to energy from a plurality of energy sources, and detecting the energy, via a plurality of detectors, after the energy has been scattered by the scattering medium.

8. The computer-implemented method of claim 7, wherein: the energy comprises light energy; and the property of the target system comprises an optical characteristic of the target system.

9. The computer-implemented method of claim 8, wherein: the optical characteristic comprises at least one of a distribution of an absorption coefficient and a distribution of a scattering coefficient in the target system.

10. The computer-implemented method of claim 1, wherein: the inaccuracies in the first and second reconstructed data are caused, at least in part, by the reconstruction algorithm.

11. The computer-implemented method of claim 1, wherein: the linear filter is defined by minimizing a difference between the data that is known to identify the property of the modeled system, and the first reconstructed data.

12. The computer-implemented method of claim 1, further comprising:

for each of a plurality of elements of the modeled system, defining at least one time-varying function that defines a time-variation of the property of the modeled system, and sampling the at least one time varying-function at a plurality of points; wherein:

the first output data is provided for each of the time-varying functions; and the first reconstructed data is obtained for each of the time-varying functions.

13. The computer-implemented method of claim 12, wherein: the time-varying functions are sinusoidal functions.

14. The computer-implemented method of claim 12, wherein: each of the time-varying functions is defined by at least one modulation frequency and at least one phase.

15. A computer-implemented method for filtering data that is representative of a target system that exhibits a non-linear relationship between system properties and measurement data to provide a reconstructed representation of the target system, comprising:

defining a modeled system that exhibits a non-linear relationship between system properties and measurement data;

obtaining first output data in a form of a first matrix from the modeled system that is a function of a property of the modeled system;

employing a computer, applying a reconstruction algorithm to the first output data to obtain first reconstructed data in a form of a second matrix that identifies, with inaccuracy, the property of the modeled system, for each of a plurality of elements of the modeled system, defining at least one time-varying function that defines a time-variation of the property of the modeled system, and sampling the at least one time varying-function at a plurality of points wherein the first output data is provided for each of the time-varying functions and the first reconstructed data is obtained for each of the time-varying functions, wherein each of the time-varying functions is defined by at least one modulation frequency and at least one phase, and any two of modulation frequencies are incommensurable;

employing a computer, determining a linear filter in an N×N matrix form, wherein multiplication of said linear filter with said first reconstructed data generates an approximation to said first output data, and wherein N is equal to a number of elements of said modeled system;

obtaining second output data from the target system that is a function of a property of the target system that corresponds to the property of the modeled system;

employing a computer, applying the reconstruction algorithm to the second output data to obtain the second reconstructed data that identifies, with inaccuracy, the property of the target system;

employing a computer, applying the linear filter to correct the second reconstructed data that represents the property of the target system.

16. A computer-implemented method for filtering data that is representative of a target system that exhibits a non-linear relationship between system properties and measurement data to provide a reconstructed representation of the target system, comprising:

defining a modeled system that exhibits a non-linear relationship between system properties and measurement data;

obtaining first output data in a form of a first matrix from the modeled system that is a function of a property of the modeled system;

employing a computer, applying a reconstruction algorithm to the first output data in a form of a second matrix to obtain first reconstructed data that identifies, with inaccuracy, the property of the modeled system, for each of a plurality of elements of the modeled system, defining at least one time-varying function that defines a time-variation of the property of the modeled system, and sampling the at least one time varying-function at a plurality of points wherein the first output data is provided for each of the time-varying functions and the first reconstructed data is obtained for each of the time-varying functions, wherein each of the time-varying functions is defined by at least one modulation frequency and at least one phase, said at least one modulation frequency is distinct from one another, and said at least one phase is distinct from one another;

employing a computer, determining a linear filter in an N×N matrix form, wherein multiplication of said linear filter with said first reconstructed data generates an approximation to said first output data, and wherein N is equal to a number of elements of said modeled system;

obtaining second output data from the target system that is a function of a property of the target system that corresponds to the property of the modeled system;

employing a computer, applying the reconstruction algorithm to the second output data to obtain the second reconstructed data that identifies, with inaccuracy, the property of the target system;

employing a computer, applying the linear filter to correct the second reconstructed data that represents the property of the target system.

17. A computer-implemented method for filtering data that is representative of a target system that exhibits a non-linear relationship between system properties and measurement data to provide a reconstructed representation of the target system, comprising:

defining a modeled system that exhibits a non-linear relationship between system properties and measurement data;

obtaining first output data in a form of a first matrix from the modeled system that is a function of a property of the modeled system;

employing a computer, applying a reconstruction algorithm to the first output data to obtain first reconstructed data in a form of a second matrix that identifies, with inaccuracy, the property of the modeled system, for each of a plurality of elements of the modeled system, defining at least one time-varying function that defines a time-variation of the property of the modeled system, and sampling the at least one time varying-function at a plurality of points wherein the first output data is provided for each of the time-varying functions and the first reconstructed data is obtained for each of the time-varying functions, wherein each of the time-varying functions is defined by at least one modulation frequency and at least one phase, and said at least one phase is randomly assigned;

employing a computer, determining a linear filter in an N×N matrix form, wherein multiplication of said linear filter with said first reconstructed data generates an approximation to said first output data, and wherein N is equal to a number of elements of said modeled system;

obtaining second output data from the target system that is a function of a property of the target system that corresponds to the property of the modeled system;

employing a computer, applying the reconstruction algorithm to the second output data to obtain the second reconstructed data that identifies, with inaccuracy, the property of the target system;

employing a computer, applying the linear filter to correct the second reconstructed data that represents the property of the target system.

18. The computer-implemented method of claim 1, wherein:

the modeled system is representative of the target system.

19. A computer-implemented method for providing a library of filters for filtering data that is representative of a system that exhibits a non-linear relationship between system properties and measurement data to provide a reconstructed representation of the target system, comprising:

defining a plurality of respective modeled systems that exhibit a non-linear relationship between system properties and measurement data, said modeled systems corresponding to respective target systems;

defining one or more functions for perturbing one or more elements of the modeled systems;

for each of the modeled systems, obtaining output data in a form of a matrix from the respective modeled system that is a function of a property of the respective modeled system, in response to perturbing the one or more elements;

for each of the modeled systems, employing a computer, applying a reconstruction algorithm to the output data to obtain reconstructed data in a form of another matrix that identifies, with inaccuracy, the property of the respective modeled system;

providing the library of filters by employing a computer and determining, for each of the modeled systems, a linear filter in an N×N matrix form, wherein multiplication of said linear filter with corresponding reconstructed data generates an approximation to corresponding output data, and wherein N is equal to a number of elements of a corresponding modeled system;

20. The computer-implemented method of claim 19, further comprising:

selecting one of the filters in the library of filters for filtering reconstructed data from a target system according to which of the modeled systems most closely matches the target system.

21. The computer-implemented method of claim 1, wherein said first output data in a form of said first matrix is an N×T matrix, wherein T is a total number of time indices within said first output data.

22. The computer-implemented method of claim 21, wherein said first reconstructed data in a form of said second matrix is another N×T matrix.

* * * * *

UNITED STATES PATENT AND TRADEMARK OFFICE
CERTIFICATE OF CORRECTION

PATENT NO. : 7,617,080 B2 Page 1 of 1
APPLICATION NO. : 10/894317
DATED : November 10, 2009
INVENTOR(S) : Randall L. Barbour et al.

It is certified that error appears in the above-identified patent and that said Letters Patent is hereby corrected as shown below:

Title Page,

Item (73) Assignee should read: --The Research Foundation of State University of New York, Albany, NY (US)--

(*) Notice: Subject to any disclaimer, the term of this patent is extended or adjusted under 35 U.S.C. 154(b) by 133 days.

should read (*) Notice: Subject to any disclaimer, the term of this patent is extended or adjusted under 35 U.S.C. 154(b) by 385 days.

Signed and Sealed this

Third Day of August, 2010

David J. Kappos
*Director of the United States Patent and Trademark Office*